United States Patent [19]

Abe et al.

[11] Patent Number: 4,895,929

[45] Date of Patent: Jan. 23, 1990

[54] PROCESS FOR PRODUCING POLYPHENYLENE ETHER, DISPERSING POLYETHER IN AQUEOUS MEDIUM AND HEATING DISPERSION

[75] Inventors: Katsuhiro Abe; Kazunori Yano; Ryuhei Matsui; Shigeki Kiriyama, all of Mie; Yoshiharu Tatsukami; Kenji Nagaoka, both of Osaka, all of Japan

[73] Assignees: Mitsubishi Petrochemical Co., Ltd., Tokyo; Sumitomo Chemical Company, Ltd., Osaka, both of Japan

[21] Appl. No.: 66,295

[22] Filed: Jun. 25, 1987

[30] Foreign Application Priority Data

Jun. 25, 1986 [JP] Japan .................................. 61-148700

[51] Int. Cl.$^4$ ............................................. C08G 65/46
[52] U.S. Cl. .................................... 528/487; 528/212; 528/214; 528/486; 528/490; 528/495; 528/496; 528/499
[58] Field of Search ............... 528/487, 486, 490, 495, 528/496, 499, 212, 214

[56] References Cited

U.S. PATENT DOCUMENTS

| | | |
|---|---|---|
| 3,630,995 | 12/1971 | Modan ................................ 528/215 |
| 3,783,147 | 1/1974 | Calicchia et al. ..................... 528/214 |
| 4,463,164 | 7/1984 | Dalton et al. ......................... 528/487 |
| 4,536,567 | 8/1985 | Hambrecht et al. ................. 528/487 |
| 4,577,010 | 3/1986 | Bottazini et al. .................... 528/487 |

FOREIGN PATENT DOCUMENTS 1015496  8/1977  Canada .

OTHER PUBLICATIONS

Condensed Chemical Dictionary, Eighth Edition, 1971, p. 588.

Primary Examiner—Harold D. Anderson
Attorney, Agent, or Firm—Sughrue, Mion, Zinn, Macpeak & Seas

[57] ABSTRACT

A process for producing a polyphenylene ether is disclosed, comprising oxidatively polymerizing a phenol in an organic solvent in the presence of a catalyst for oxidative polymerization, finely dispersing the resulting polyphenylene ether containing the organic solvent in an aqueous dispersion medium containing an acid compound, and heating the aqueous dispersion to remove the solvent from the polyphenylene ether. The resulting polyphenylene ether has excellent powder properties and contains a reduced amount of a catalyst residue.

22 Claims, No Drawings

PROCESS FOR PRODUCING POLYPHENYLENE ETHER, DISPERSING POLYETHER IN AQUEOUS MEDIUM AND HEATING DISPERSION

FIELD OF THE INVENTION

This invention relates to a process for producing a polyphenylene ether, and more particularly to a stable process for producing a polyphenylene ether having improved powder properties and containing a reduced amount of a catalyst residue.

BACKGROUND OF THE INVENTION

Polyphenylene ethers are generally obtained by oxidative polymerization of phenols in an aromatic hydrocarbon solvent or a mixed solvent of an aromatic hydrocarbon and an alcohol in the presence of a complex catalyst containing copper, manganese, or cobalt and in the copresence of an oxygen-containing gas.

The reaction mixture of the aforesaid polymerization inevitably contains impurities which impair characteristics of polyphenylene ethers in no small quantities, such as a residue of the catalyst used and diphenoquinones as by-products. These impurities have been generally removed by contacting the polymerization reaction mixture with a catalyst decomposing agent or a reducing agent, such as mineral acids, e.g., hydrochloric acid, sulfuric acid, etc., or organic acids, e.g., acetic acid.

It has also been proposed to remove a metallic component of the catalyst by using a chelating agent as disclosed in German Patent Nos. 2,460,323 and 2,532,477, U.S. Pat. Nos. 4,026,870 and 4,071,500, and European Patent Nos. 81,140 and 103,275.

However, the treatment with acids or chelating agents involves use of alcohols in a large quantity relative to the polymerization mixture, which leads to an increased cost for alcohol recovery and ultimately to bad economy. Further, since the polyphenylene ethers precipitate upon addition of alcohols in the form of considerably fine particles, special additional equipments are required for drying and transportation of such fine particles in order to cope with problems such as dusting. Furthermore, such fine particles cause many troubles in molding, such as starved feeding from a hopper, insufficient feeding to a granulator, and the like. If the amount of the alcohol to be used is reduced, the polyphenylene ether is agglomerated in subsequent steps, e.g., a drying step, and becomes difficult to handle.

SUMMARY OF THE INVENTION

One object of this invention is to provide a process for removing an organic solvent from a polymerization mixture of a polyphenylene ether to thereby obtain a polyphenylene ether having improved powder properties and containing a reduced amount of a catalyst residue.

As a result of extensive investigations, it has now been found that the above object can be accomplished by dispersing a polyphenylene ether as produced by polymerization in an aqueous dispersion medium having incorporated thereto an acid compound to effect solvent removal. The present invention has been completed based on this finding.

The present invention relates to a process for producing a polyphenylene ether comprising oxidatively polymerizing a phenol in an organic solvent in the presence of a catalyst for oxidative polymerization and finely dispersing the formed polyphenylene ether in an aqueous dispersion medium containing an acid compound under heating.

According to the present invention, a polyphenylene ether having a low content of a catalyst residue and excellent powder properties can be stably produced.

DETAILED DESCRIPTION OF THE INVENTION

The phenols which can be used in the present invention are phenol monomers represented by formula

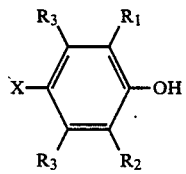

wherein X represents a monovalent atom selected from a hydrogen atom, a chlorine atom, a bromine atom, or an iodine atom; $R_1$ represents a monovalent substituent selected from an alkyl group, an alkoxy group, a phenyl group, a phenoxy group, a benzyl group, a tolyl group, or a halogenated alkyl, alkaoxy or phenyl group having at least two carbon atoms between a halogen atom and the phenol nucleus; $R_2$ represents a monovalent atom or group selected from a halogen atom, an alkyl group, an alkoxy group, a phenyl group, phenoxy group, benzyl group, a tolyl group, or a halogenated alkyl, alkoxy or phenyl group having at least two carbon atoms between a halogen atom and the phenol nucleus; and $R_3$ represents a monovalent atom or group selected from a hydrogen atom, a halogen atom, an alkyl group, an alkoxy group, a phenyl group, a phenoxy group, a benzyl group, a tolyl group, or a halogenated alkyl, alkoxy or phenyl group having at least two carbon atoms between a halogen atom and the phenol nucleus.

In the above definition, when $R_1$, $R_2$, or $R_3$ represents a hydrocarbon group, such a hydrocarbon group preferably has from 1 to 12 carbon atoms; and when $R_1$, $R_2$, or $R_3$ represents a halogen atom or a halogenated hydrocarbon group, examples of the halogen atom include a chlorine atom, a bromine atom, and an iodine atom.

examples of the above-described phenol include 2,6-dimethylphenol, 2,6-diethylphenol, 2,6-dibutylphenol, 2,6-dilaurylphenol, 2,6-dipropylphenol, 2,6 diphenylphenol, 2,6-dimethoxyphenol, 2,3,6-trimethylphenol, 2,3,5,6-tetramethylphenol, 2,6-diethoxyphenol, 2,6-di(chlorophenoxy)phenol, 2,6-dimethyl-3-chlorophenol, bromophenol, 2,6-di(chloroethyl)phenol, 2-methyl-6-lphenol, 2,6-di(chloropropyl)phenol, 3-methyl-6-t-butylphenol, etc. Of these, 2,6dimethylphenol is particularly preferred. These monomers may be used either individually or in combinations thereof or in combinations with other phenol monomers.

Polyphenylene ethers can be obtained by reacting the phenol monomer with oxygen or an oxygen-containing gas in an organic solvent in the presence of an oxidative polymerization catalyst, particularly a complex catalyst containing copper, manganese, or cobalt.

Any of known catalysts can be used in the oxidative polymerization. Examples of known catalysts include those containing copper as disclosed in Japanese Patent Publication Nos. 18692/61 and 13423/65 and U.S. Pat. No. 3,857,863, such as catalysts composed of a copper (I) or (II) salt (e.g., cuprous chloride, cupric chloride, cuprous bromide, and cupric bromide) and an amine; those containing manganese as disclosed in Japanese Patent Publication No. 30354/65, Canadian Patent No. 839,551, Japanese Patent Application (OPI) No. 32523/81 (the term "OPI" as used herein means "unexamined published application"), U.S. Pat. No. 4,385,168, such as catalysts composed of a manganese (II) salt (e.g., manganese (II) chloride, manganese (II) nitrate, and manganese (II) acetate) and an orthohydroxyazo compound, an oxine derivative, or an alkanolamine; and those containing cobalt as disclosed in Japanese Patent Publication No. 23555/70, such as catalysts composed of a cobalt (II) or (III) compound (e.g., cobalt chloride) and an amine. In general, a halide, carbonate, acetate, nitrate, or phosphate of a divalent manganese, copper, or cobalt and a complexing agent, e.g., amine compounds and alkanolamines, are added to the reaction system.

The organic solvent which can be used for the polymerization includes aromatic hydrocarbons, e.g., benzene, toluene, xylene, etc., and is used either alone or in admixtures thereof with alcohols, e.g., methanol, ethanol, isopropanol, etc., with methanol being preferred. The alcohol is used in an amount of up to 65% by volume, preferably from 5 to 50% by volume, and more preferably from 10 to 45% by volume, based on the total amount of solvent.

The molecular weight of the polyphenylene ethers can be controlled arbitrarily by the reaction temperature, the reaction time, the amount of the catalyst, and the kind and composition of the solvent. The polymerization is generally carried out so that the resulting polymerization reaction mixture may contain a polyphenylene ether having such a molecular weight as having an intrinsic viscosity of 0.25 dl/g or more as determined in a chloroform solution thereof at 30° C.

The polymerization reaction mixture is obtained as a slurry in which a polyphenylene ether forms a precipitate or as a solution in which a polyphenylene ether does not substantially precipitate depending on the composition of the solvent used. In general, the reaction mixture is obtained as a slurry when a ratio of the aromatic hydrocarbon to the alcohol is 65/35 by volume or less.

In the subsequent treatment for solvent removal, the polyphenylene ether to be treated in an aqueous dispersion medium containing an acid compound may be in the form either of solid particles containing the solvent (wet solid) or of a solution dissolved in the solvent.

Therefore, the reaction mixture obtained as a slurry can be subjected to the treatment in an aqueous dispersion medium containing an acid compound as it is or after a liquid phase has been separated therefrom.

The reaction mixture obtained as a solution can be subjected directly to the treatment. Alternatively, a poor solvent, such as alcohol, is added to the reaction mixture in the form of a solution to precipitate the polyphenylene ether, followed by solid-liquid separation, and the separated solid polyphenylene ether in a wet state can be subjected to the treatment.

There is a preferred range for the amount of the organic solvent (good solvent) for polyethylene ether present in the wet polyphenylene ether to be treated because the good solvent exerts its dissolving action on the polyphenylene ether when dispersed in an aqueous dispersion medium and thus governs the dispersion state. Such a preferred content of the good solvent ranges from 50 to 150 parts, more preferably from 70 to 150 parts, by weight based on 100 parts by weight of the polyphenylene ether. If it is less than 50 parts by weight, the particle size of the polyphenylene ether particles in a hot aqueous dispersion medium becomes small, increasing the proportion of those particles having a particle size of 100 μm or smaller. On the other hand, if the amount of the good solvent exceeds 150 parts by weight, the polyphenylene ether is likely to agglomerate in the hot aqueous dispersion medium. In the case where the polyphenylene ether contains both the good solvent and an alcohol (a poor solvent for polyphenylene ether) the alcohol is rapidly transferred to the aqueous dispersion medium upon treatment.

The acid compound to be added to a dispersion medium for solvent removal includes inorganic acids, organic acids, and salts thereof. Highly water-soluble acid compounds are preferred. Specific examples of the acid compound are acetic acid, hydrochloric acid, sulfuric acid, phosphoric acid, and salts thereof, with phosphorus compounds being preferred. Of the phosphorus compounds, more preferred are inorganic phosphoric acids, e.g., phosphoric acid, phosphorous acid, orthophosphoric acid, pyrophosphoric acid, metaphosphoric acid, hexametaphosphoric acid, acidic metaphosphoric acid, polyphosphoric acid, and salts thereof, e.g., alkali metal salts and alkaline earth metal salts. These phosphoric acids and their salts are particularly effective to produce polyphenylene ether particles having excellent powder properties and having a low content of a catalyst residue, while effectively transferring a very low-molecular weight polyphenylene ether into the aqueous phase. The acid compound can be used either individually or in combinations thereof. The amount of the acid compound to be added usually ranges from 0.1 to 100 mols, preferably from 1 to 30 mols, per mol of the metal compound as a catalyst component, e.g., a copper compound, a manganese compound, a cobalt compound, etc.

It is preferable that the aqueous dispersion medium containing an acid compound, particularly a phosphorus compound, further contain a reducing agent. The reducing agent to be added includes sodium sulfite, sodium hydrogensulfite, sodium dithionite, and the like. These reducing agents may be used either individually or in combinations thereof. The reducing agent is usually added in an amount of 0.1 mol or more, preferably from 1 to 50 mols, per mol of the metal compound as a catalyst component.

The polyphenylene ether in the form of a solid or a solution is finely dispersed in 1 to 10 times the volume of the aqueous dispersion medium containing the aforesaid acid compound and, if used, the reducing agent under heating. The dispersed particle size in the dispersion is not strictly limited, but is usually not more than 1 mm, preferably from 0.1 to 0.5 mm.

The disperse system is heated usually at a temperature between 30 to 150° C., preferably between 40° C. and 100° C., during the treatment. If the temperature is lower than 30° C., effective solvent removal cannot be achieved. If it exceeds 150° C., agglomerates are easily formed, resulting in a failure of operation or in the production of coarse particles.

Dispersing can be effected by mechanical agitation and/or blowing of a gas. The gas which can be blown through the disperse system may be either active or inactive, and preferably includes inert gases, e.g., nitrogen, argon, helium, etc. The gas is preferably blown at a feed rate of from 0.01 to 10 cm per second in terms of superficial velocity in a column. The solvent removing effect is reduced at a velocity less than 0.01 cm/sec, and entrainment of the polyphenylene ether tends to occur at a velocity more than 10 cm/sec. The gas is preferably bubbled through the disperse system from the bottom of a vessel to assure gas dispersibility.

Bubbling of a gas through the heated disperse system is effective to remove the solvent at a lower temperature and to make particle concentration distribution and temperature distribution uniform throughout the disperse system to thereby prevent agglomeration of the polyphenylene ether. In particular, bubbling of an inert gas also serves to remove oxygen in the system to thereby inhibit oxidation of the polyphenylene ether or the reducing agent. Further, bubbling of an inert gas is effective to efficiently extract the catalyst component present in the polyphenylene ether, e.g., copper, manganese, cobalt, etc., into the aqueous phase while efficiently performing solvent removal.

During the treatment, it is desirable that the temperature of the gaseous phase above a liquid level be higher than that of the aqueous dispersed phase whereby refluxing of the solvent in the gaseous phase and formation of coarse particles of the polyphenylene ether can be suppressed. To this effect, a dispersion vessel to be used may be equipped with an external heating means, for example, a steam jacket, that heats the upper portion of the vessel more strongly than the lower portion. If the gaseous phase temperature is lower than that of the liquid phase, the solvent cannot be removed effectively, and refluxing of the solvent takes place in the gaseous phase, which causes adhesion of the polyphenylene ether onto the inner wall of the vessel, leading to formation of coarse particles.

It is also preferable to reduce the inner pressure of the dispersion system while the organic solvent-containing polyphenylene ether is dispersed in the heated aqueous dispersion medium for solvent removal. Reduction of the inner pressure is effective to decrease the treating temperature below the temperature at which the polyphenylene ether in the dispersed particles is uniformly dissolved in the organic solvent to thereby prevent the polyphenylene ether from agglomerating and also to remove oxygen in the system, thus preventing the reducing agent, if used, and the polyphenylene ether from oxidation.

The step of dispersing the organic solvent-containing polyphenylene ether in an aqueous medium and the step of heating the dispersion may be carried out simultaneously in a continuous system or the former step can be followed by the latter step in a batch system.

Solvent removal by heating the dispersion is performed until the organic solvent content in the resulting polyphenylene ether has decreased to 100% by weight or less, preferably 80% by weight or less, on a dry basis. The term "organic solvent content" as used herein means the total content of residual solvents including a poor solvent, if any, based on dried polyphenylene ether. If the residual solvent content exceeds 100% by weight, the resulting polyphenylene ether particles become tacky, causing trouble in the subsequent steps, such as clogging of filter cloth of a centrifugal separator, agglomeration during drying, and the like.

The aqueous dispersion containing polyphenylene ether particles from which the solvent has been removed is then subjected to solid-liquid separation by means of a filter, a centrifugal separator, etc., and the collected solid is washed with water and dried by means of a vacuum dryer, a fluidized bed dryer, a rotary dryer, etc. to obtain powders.

The resulting polyphenylene ether powders retain the particle properties observed in the aqueous dispersed system and have a narrow particle size distribution as containing substantially no particles of 100 $\mu$m or smaller or 2000 $\mu$m or larger in diameter and a bulk density of 0.40 g/cm$^3$ or more. Further, they have a residual catalyst content of not more than 10 ppm. A sheet prepared by pressing the resulting polyphenylene ether powders at a temperature of 250° C. and at a pressure of 100 kg/cm$^2$G shows an L value of 40 or higher as measured by the use of a color difference meter ("CP6R-1001DP" produced by Nippon Denshoku Kogyo K.K.). The L value as referred to herein is a value calculated from equation:

$$L = 10Y^{\frac{1}{2}}$$

wherein Y represents a luminance transmittance according to CIE (Commission Internationale de l'Eclairage).

The present invention will now be illustrated in greater detail by way of the following examples, but it should be understood that they are given for illustrative purposes only and are not deemed to limit the present invention. In these examples, all the percents are by weight unless otherwise indicated. An average particle size of the polyphenylene ether powders prepared in these examples was determined by sieve analysis using an ASTM standard sieve, taking a mesh size through which 50% by weight of the particles pass as a 50% average particle size.

EXAMPLE 1

In a 1 l-volume glass-made reaction vessel equipped with a stirrer, a thermometer, a condenser, and a tube for introducing oxygen were charged 100 g of 2,6-dimethylphenol, 345 ml of xylene, and 127 ml of methanol to form a uniform solution. To the solution were added 2 g of sodium hydroxide, 1.22 ml of piperidine, 0.46 g of Eriochrome ® Black T (3-hydoxy-4-[(1-hydroxy-2-naphthalenyl)azo]-7-nitro-1-naphthalenesulfonic acid monosodium salt, available from Nakarai Kagaku Yakuhin K.K.), and 0.081 g of manganese chloride tetrahydrate. The xylene/methanol volume ratio was 71.5/28.5.

Oxygen was blown into the mixture at a feed rate of 300 ml/min while vigorously stirring to effect oxidative polymerization. The temperature of the system was kept at 30° C. during the blowing, and the oxygen feed was ceased after the elapse of 5 hours from the start. At this point, the polymerization mixture was a viscous solution.

A part of the reaction mixture was withdrawn, and a small amount of methanol was added thereto. The formed precipitate collected by filtration and dried was found to have an intrinsic viscosity of 0.471 dl/g.

To the reaction mixture was added 218 ml of methanol to convert the solution state to a slurry state. The xylene/methanol ratio of the slurry was 50/50 by volume. The slurry was filtered through a glass filter (G-4) to obtain a wet solid containing 96 g of polyphenylene ether, 110 g of xylene, and 8 g of methanol. In a 1 l-volume vessel were charged the thus prepared wet solid, 360 ml of water, 20 ml of an aqueous solution containing 1.2 g of sodium pyrophosphate decahydrate, and 20 ml of an aqueous solution containing 0.8 g of sodium hydrogensulfite, and the mixture was vigorously stirred to effect decomposition of the catalyst and reduction while blowing nitrogen to the bottom of the vessel at a rate of 700 ml/min at 55° C. for 4 hours, 70° C. for 2 hours, and then at 80° C. for 2 hours (8 hours in total) to effect solvent removal.

The dispersion was withdrawn and subjected to solid-liquid separation in a basket type centrifugal separator to collect a polymer. The resulting polymer was washed with 400 ml of water in a 1 l-volume vessel at an inner temperature of 50° C. for 30 minutes. The aqueous phase was removed in a basket type centrifugal separator, and the residual polymer was vacuum-dried at 150° C. for 12 hours to obtain polyphenylene ether powders.

The resulting powders were found to have a manganese content of 8 ppm and a bulk density of 0.49 g/cm$^3$, a 50% average particle size of 200 μm, and a narrow size distribution with the proportions of fine particles of 100 μm or smaller and coarse particles of 2000 μm or greater being 2.4% and 0.0%, respectively. A pressed sheet obtained therefrom had an L value of 47.6.

EXAMPLE 2

A polymerization reaction mixture in the form of a solution was obtained in the same manner as in Example 1.

To the solution was added 443 ml of methanol to form a slurry. A xylene/methanol ratio of the slurry was 37.7/62.3 by volume. The slurry was filtered through a glass filter (G-4) to collect a wet solid containing 96 g of polyphenylene ether, 90 g of xylene, and 25 9 of methanol.

The wet solid was treated in the same manner as described in Example 1. The resulting polyphenylene ether powders had a manganese content of 7 ppm, a bulk density of 0.48 g/cm$^3$, a 50% average particle size of 180 μm, and a narrow size distribution with the proportions of fine particles of 100 μm or smaller and coarse particles of 2000 μm or greater being 3.6% and 0.0%, respectively. A pressed sheet obtained therefrom had an L value of 49.2.

EXAMPLE 3

A polymerization reaction mixture in the form of a solution was obtained in the same manner as in Example 1.

To the solution was added 644 ml of methanol to obtain a slurry containing xylene and methanol at a volume ratio of 30.9/69.1. The slurry was filtered through a glass filter (G-4) to collect a wet solid containing 96 g of polyphenylene ether, 72 g of xylene, and 49 g of methanol.

The wet solid was treated in the same manner as described in Example 1. The resulting powders had a manganese content of 4 ppm, a bulk density of 0.48 g/cm$^3$, a 50% average particle size of 150 μm, and a narrow size distribution with the proportions of fine particles of 100 μm or smaller and coarse particles of 2000 μm or greater being 4.8% and 0.0%, respectively. A pressed sheet obtained therefrom had an L value of 52.3.

EXAMPLE 4

In a 1 l-volume glass-made reaction vessel equipped with a stirrer, a thermometer, a condenser, and a tube for introducing oxygen were charged 100 g of 2,6-dimethylphenol, 196.5 ml of benzene, and 160.8 ml of methanol to form a uniform solution. To the solution were added 2 g of sodium hydroxide, 1.87 ml of 2-pipecoline, 0.76 g of Eriochrome ® Black T, and 0.119 g of manganese chloride tetrahydrate. The benzene/methanol ratio was 55/45 by volume.

Oxygen was blown into the mixture at a feed rate of 300 ml/min while vigorously stirring for 5 hours, with the reaction temperature being kept at 50° C. The reaction mixture at the time of stopping oxygen feed had a state of slurry. A part of the slurry was withdrawn, filtered, dried, and found to have an intrinsic viscosity of 0.51 dl/g.

The polymerization reaction mixture was filtered through a glass filter (G-4) to obtain a wet solid which was found to contain 95 g of polyphenylene ether, 90 g of benzene, and 5 g of methanol. The wed solid was transferred to a 1 l-volume vessel and treated with 360 ml of water, 20 ml of an aqueous solution containing 1.2 g of sodium pyrophosphate decahydrate, and 20 ml of an aqueous solution containing 0.8 g of sodium hydrogensulfite under vigorously stirring to effect decomposition of the catalyst and reduction while blowing nitrogen from the bottom of the vessel at a feed rate of 500 ml/min at 50° C. for 1 hour to effect solvent removal.

The dispersion was withdrawn and subjected to solid-liquid separation in a basket type centrifugal separator. The polymer collected was washed in a 1 l-volume vessel with 400 ml of water at room temperature for 30 minutes, followed by centrifugation in a basket type centrifugal separator to remove the aqueous phase. The resulting polymer was dried in a vacuum drier at 90° C. for 12 hours to obtain 94.5 g of polyphenylene ether powders.

The resulting powders had a manganese content of 10 ppm, a bulk density of 0.49 g/cm3, a 50% average particle size of 170 μm, and a narrow size distribution with the proportions of fine particles of 100 μm or smaller and coarse particles of 2000 μm or greater being 2.9% and 0.0%, respectively. A pressed sheet obtained therefrom had an L value of 43.4.

EXAMPLE 5

A polymerization reaction mixture was prepared in the same manner as described in Example 1.

The reaction mixture was then treated in the same manner as in Example 1, except that the reaction mixture was treated as such without the addition of the methanol and that the amounts of sodium pyrophosphate decahydrate and sodium hydrogensulfite were changed to 3.6 g and 2.4 g, respectively.

The resulting polyphenylene ether powders had a manganese content of 15 ppm, a bulk density of 0.44 g/cm$^3$, a 50% average particle size of 460 μm, and a size distribution with the proportions of fine particles of 100 μm or smaller and coarse particles of 2000 μm or greater being 0.2% and 1.5%, respectively. A pressed sheet obtained therefrom had an L value of 37.6.

EXAMPLE 6

A polymerization reaction mixture was prepared in the same manner as described in Example 1.

The reaction mixture was then treated in the same manner as in Example 5, except that nitrogen was not introduced and that instead, solvent removal was effected under a reduced pressure of 50 mmHg.

The resulting polyphenylene ether powders had a manganese content of 17 ppm, a bulk density of 0.46 g/cm$^3$, a 50% average particle size of 480 μm, and a size distribution with the proportions of fine particles of 100 μm or smaller and coarse particles of 2000 μm or greater being 8.3% and 3.2%, respectively. A pressed sheet obtained therefrom had an L value of 37.0.

While the invention has been described in detail and with reference to specific embodiments thereof, it will be apparent to one skilled in the art that various changes and modifications can be made therein without departing from the spirit and scope thereof.

What is claimed is:

1. A process for producing a polyphenylene ether having improved powder properties and containing a reduced amount of a catalyst residue comprising oxidatively polymerizing a phenol in an organic solvent in the presence of a catalyst for oxidative polymerization, finely dispersing resulting polyphenylene ether solid particles containing the organic solvent in an amount of from 50 to 150 parts by weight based on the weight of the polyphenylene ether in an aqueous dispersion medium containing an inorganic phosphoric acid or a salt thereof, and heating the aqueous dispersion to remove the solvent from the polyphenylene ether and extract the catalyst component present in the polyphenylene ether into the aqueous phase.

2. A process as in claim 1, wherein said polyphenylene ether solid particles containing the organic solvent is prepared by adding a poor solvent for the polyphenylene ether to the reaction mixture of the oxidative polymerization and separating the formed precipitate therefrom.

3. A process as in claim 1, wherein said polyphenylene ether containing the organic solvent is in the form of a slurry dispersed in the solvent.

4. A process as in claim 1, wherein said polyphenylene ether solid particles containing the organic solvent contains from 70–150 parts by weight of a good solvent for polyphenylene ether based on 100 parts by weight of the polyphenylene ether.

5. A process as in claim 2, wherein said heating is carried out at a temperature of from 30° to 150° C.

6. A process as in claim 5, wherein said heating is carried out at a temperature of from 40° to 100° C.

7. A process as in claim 1, wherein said inorganic phosphoric acid or a salt thereof is present in the aqueous dispersion medium in an amount of from 0.1 to 100 mols per mol of metal compound used in the catalyst.

8. A process as in claim 12, wherein said inorganic phosphoric acid or a salt thereof is present in the aqueous dispersion medium in an amount of from −130 mols per mol of a metal compound used in the catalyst.

9. A process as in claim 1, wherein said aqueous dispersion medium further contains a reducing agent.

10. A process as in claim 9, wherein said reducing agent is present in an amount of 0.1 mol or more per mol of a metal compound used in the catalyst.

11. A process as in claim 10, wherein said reducing agent is present in an amount of 1 to 50 mols per mol of a metal compound used in the catalyst.

12. A process as in claim 1, wherein the polyphenylene ether containing the organic solvent is dispersed in the aqueous dispersion medium to a particle size of not greater than 1 mm.

13. A process as in claim 12, wherein the polyphenylene ether containing the organic solvent is dispersed in the aqueous dispersion medium to a particle size of from 0.1 to 0.5 mm.

14. A process as in claim 1, wherein said solvent removal is carried out while bubbling a gas through the dispersion.

15. A process as in claim 14, wherein said gas is an inert gas.

16. A process as in claim 15, wherein said inert gas is bubbled at a superficial velocity in column of from 0.01 cm/sec to 10 cm/sec.

17. A process as in claim 1, wherein said solvent removal is carried out under reduced pressure.

18. A process as in claim 1, wherein said solvent removal is carried out while heating the gaseous phase in the system at a temperature higher than that of the liquid phase.

19. A process as in claim 1, wherein said solvent removal is carried out until the residual organic solvent content in the resulting polyphenylene ether has decreased to 100% by weight or less on a dry basis.

20. A process as in claim 19, wherein said solvent removal is carried out until the residual organic solvent content in the resulting polyphenylene ether has decreased to 80% by weight or less on a dry basis.

21. A process as in claim 1, wherein said organic solvent is an aromatic hydrocarbon.

22. A process as in claim 4, wherein said good solvent is an aromatic hydrocarbon.

* * * * *